June 18, 1940.  S. CALVERT  2,205,058
SOUND RECORDER
Filed Nov. 22, 1937
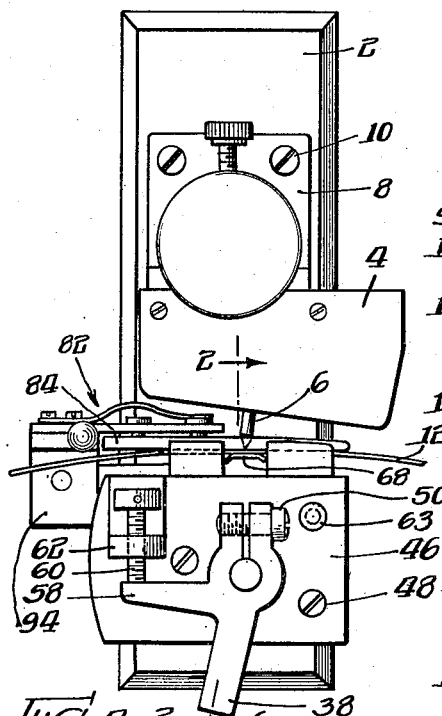
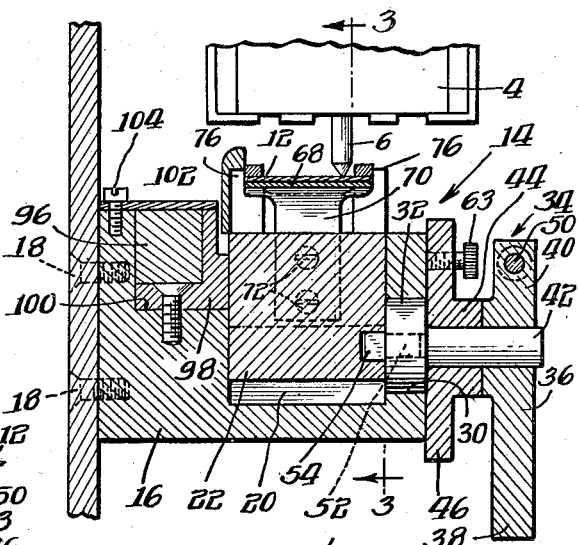
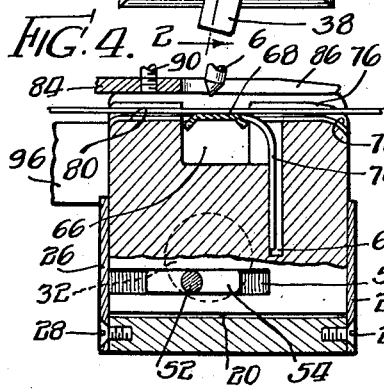
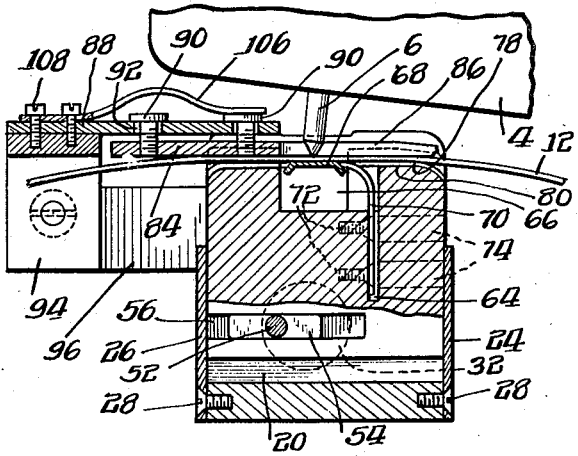
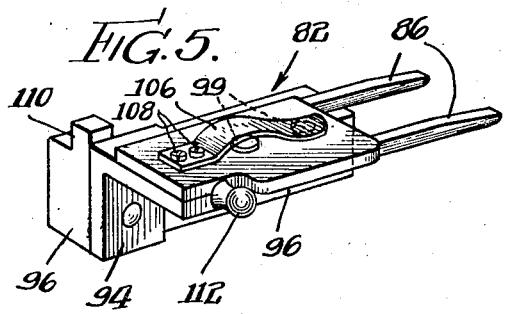
Inventor:
Sumter Calvert
By: Cox & Moore attys Patented June 18, 1940

2,205,058

UNITED STATES PATENT OFFICE 2,205,058

SOUND RECORDER

Sumter Calvert, Chicago, Ill.

Application November 22, 1937, Serial No. 175,835

9 Claims. (Cl. 274—11)

This invention relates to a method of and an apparatus for recording and reproducing sound on film, particularly motion picture film.

It is an object of applicant's invention to provide a simple and inexpensive method and apparatus for recording sound on motion picture film, with more particular relation to a method and an apparatus for home and amateur use.

The present photographic or light track methods for recording and reproducing sound on picture film require expensive processing, and a large amount of laboratory equipment for developing and fixing the film and projecting the same.

Attempts have heretofore been made to record sound on motion picture film by cutting or burning processes, the results of which have been unsatisfactory because of the recording on the film of an excessive ground noise and extraneous vibrations. In order to eliminate these ground noises and extraneous vibrations, it has been proposed to support the film upon which the sound is being mechanically recorded, or from which it is being mechanically reproduced, upon a pre-grooved support. This pre-grooving of the film support, while effecting some elimination of the noise and vibration, causes considerable distortion of the film by the formation of a ridge on the opposite side of the film from the side on which the sound groove is cut. This ridge on one side of the film interferes with the proper fitting of the film between the aperture gates of the picture projector and with the proper engagement of the film in the track of the sound reproducer. More objectionable, however, than the ridge on the film is the loss in frequency range and tone quality caused by the pre-grooved support. This is due to the rigidity of the side walls of the groove which limit and hinder the full, free, lateral movement of the recording stylus.

It has further been proposed to eliminate excessive ground noise and extraneous vibrations and other deficiencies of the mechanical processes by employing felt or other soft, resilient material as a support for the film as it passes under the recording or reproducing stylus. This, while resulting in an improvement in some respects, has been found to be quite objectionable in other respects. For example, the felt or other soft, resilient material yields too readily to the impress of the stylus on the film, thereby permitting curving or "bellying" of the film, which results in undesirable distortion of the shape of the film and prevents proper focusing of the picture in the projector.

Felt and other soft and resilient materials of like nature also gather dirt and grit and soon ruin the film by scratching and marring the emulsion.

The greatest deficiency, however, of these felt and soft, resilient supports resides in the fact that they permit the film to hug the stylus during recording and thereby hamper or interfere with the full, free lateral movement of the stylus under the impulse of the sound vibrations to be recorded.

This hugging of the film and the limitation of the free movement of the stylus has a markedly deleterious effect upon the frequency range, quality and clarity of the sound recorded. It is accordingly an object of applicant's invention to provide a method of and an apparatus for mechanically recording sound on picture film, which shall be free of the defects and insufficiencies of these known methods and apparatuses.

Another object of applicant's invention is to provide a method of and apparatus for indenting sound vibrations in a picture film, free of extraneous ground noises and vibrations and without loss of frequency range or impairment of tone quality.

It is a further object of applicant's invention to provide a novel and efficient apparatus for supporting and guiding a picture film beneath a recording or reproducing stylus, having a diamond point of predetermined angle and radius, in such manner that the recording or reproducing stylus may have full, free lateral movement and the picture film supported against any possibility of distortion during recording or reproducing.

Other and further objects and advantages of the invention will be apparent from the following description when taken in connection with the accompanying drawing, wherein:

Fig. 1 is a view in elevation of a sound recording head embodying the invention;

Fig. 2 is a fragmentary, vertical section taken along the line 2—2 of Fig. 1;

Fig. 3 is a fragmentary, vertical section taken along the line 3—3 of Fig. 2;

Fig. 4 is a fragmentary, vertical section similar to Fig. 3 with certain parts in a different adjusted position;

Fig. 5 is a view in perspective of a film tensioning element for the surface of the film which engages the stylus.

As shown in the drawing, applicant's invention comprises a supporting plate 2 which may be secured in any desired manner to the frame of a picture camera. A sound recording head 4, comprising a stylus 6 and suitable electro-magnetic means for operating the stylus 6, may be secured by a supporting base 8 to the supporting plate 2 as by screws or bolts 10. The sound recording head 4 may be mounted on its base 8 in the conventional manner, permitting horizontal and vertical adjustment of the sound recording head properly to aline the recording stylus longitudinally and transversely of the film 12.

The supporting means 14 in Fig. 2 comprises a stationary base or casting 16 secured to the mounting plate 2 as by screws 18. The base 16 is provided with an enlarged rectangular slot or opening 20 extending longitudinally thereof and receiving therein a rectangular slide block 22 forming a film guiding means or track. The slide block 22 is retained in position within the slot or opening 20 against endwise movement by end plates 24 and 26 which are secured adjacent their lower edges to the ends of the base 16 as by screws 28. A cylindrical opening 30 extends into communication with the slot or opening 20 from the outer, free surface of the base 16 and in this opening is mounted an eccentric or cam 32 forming a part of an operating means 34 for micrometrically adjusting the slide block 22 vertically in the slot 20 toward and from the film 12.
The operating means 34 comprises, in addition to the eccentric or cam 32, an operating lever 36 having an extending handle portion 38 and an oppositely extending, bifurcated portion 40, the lever being secured to a stud shaft 42 journaled in the boss 44 of a face plate 46 bolted to the outer face of the base 16 as by screws 48. The operating lever 36 is clamped on the shaft 42 by a clamping screw 50 received in the bifurcated end portion 40 of the lever. The eccentric or cam 32 is formed integrally with or is fixedly secured to the stud shaft 42 and is provided with an opening to receive eccentrically a pin 52 formed integrally with or secured to a slide bar 54. The slide bar 54 is mounted for reciprocation in a guide slot 56 in the slide block 22.

It will be seen that upon movement of the lever 36, the eccentric or cam 32, the eccentric pin 52 and the slide bar 54 will be operated to move the slide 22 vertically in the slot 20 toward and from the film. Movement of the slide 22 downwardly in the slot 20 is limited by the engagement of the block with the bottom of the slot and movement of the slide 22 outwardly of the slot is limited by the engagement of a laterally extending arm 58 of the lever 36 with an adjusting screw 60 threadedly received in a lug 62 secured to or formed integrally with the face plate 46. If desired, a screw 63 threaded in and extending through the face plate 46 may be provided for frictionally clamping the slide block 22 in adjusted position.

The adjustable slide 22 forming the film guiding means or track is provided with a vertically extending, transverse opening 64 in communication at its upper end with a central slot 66 extending transversely opposite the stylus. Within the slot 66 is mounted a hard surfaced flat bar 68 secured to or formed with a resilient plate or spring strip 70 which extends into the opening 64. The spring strip 70 is secured to the slide block 22 within the opening 64 by screws 72 and the end portion of the slide outwardly of the opening 64 is provided with openings 74 through which the screws 72 may be inserted to clamp the strip to the block. Other forms of springs and spring mountings may be used, such as, for example, a coil spring; a helical spring; a helical or coil spring within or operating upon a piston supporting the bar 68.

The bar 68, which may be of steel or other hard metallic substance, glass or Bakelite, is glass-hardened and highly polished and is of a width equal to or slightly greater than the width of the film. The object of this hard and highly polished bar 68 is to act as a support for the film directly beneath the point of the stylus and to keep the film at all times in contact with the stylus, the spring support 70 yielding to the pressure of the stylus just sufficiently to avoid scratching or abrasion of the sound groove.

It will be evident that the bar 68 permits the stylus practically absolute freedom of lateral movement in indenting the impulses received by the recorder head 4. The tension which the bar exerts on the film and the pressure which the bar exerts upwardly against the film and stylus may be precisely adjusted by manipulation of the operating means 36 to raise or lower the slide block 22.

The upper surface of the slide block or film guiding means 22 is cut away to provide upstanding guide flanges 76, between which the film is received, and guide tracks 78 on which the edges of the film are supported in its movement across the slide bar. Portions of the surface of the block between the guide tracks 78 are relieved or recessed as at 80 to prevent contact with the film except at the sides so that in traversing the slide bar the emulsion coated or picture portion of the film will not be deleteriously affected. The film, like all other non-picture film, is coated on one side with the emulsion layer in which the picture is recorded, and, as is common, is moved across the film guide with this coated side in engagement with the guide so that the recording may be effected on the opposite, non-coated side of the film. Similarly, the portion of the supporting bar 68 between the edges of the film on which the sound track is to be recorded may be relieved or depressed to prevent engagement of the bar with the picture portion of the film. The bar 68 is adjusted so that when the film 12 is not in position thereon, it extends a predetermined slight distance above the film supporting surface of the guide tracks 78.

Means 82 is provided for engaging the upper or recording face of the film to insure a smooth feeding of the film past the stylus and to maintain the film flat as it passes beneath the stylus. This means comprises a shoe or plate 84 having forwardly projecting, transversely spaced fingers or bars 86, slightly curved upward at their ends. The plate 84 is supported on a plate 88 by means of screws 90 passing loosely through enlarged openings 92 in the plate 88.

The plate 88 is bolted at its rear end to an angle bracket 94 secured to a slide bar 96. This slide bar 96 is adapted to be slidably received on an L-shaped bar 98 bolted to the support 16 within a slot 100 adjacent to the slot 20. A cover plate 102 of resilient metal overlies the bar 96 and frictionally maintains it in position on the bar 98, the cover plate 102 being bolted along one edge to the support 16 as by screws 104. A spring strip 106 of metal or the like is secured to the plate 88 and the bracket 94 by the bolts 108 which secure the plate and bracket together and this spring strip engages the head of one or more of the screws 90 in order to apply to the shoe 84 a certain force in a downward direction. The shoe 84 engages the film 12 beneath the stylus and at the side edges of the film and applies a tension thereto. The shoe also maintains the film flat beneath the stylus and prevents buckling, creasing or warping of the film.

The bar 96 is provided at its outer end with an upstanding lug 110 to limit the movement of the bar inwardly relative to the bar 98 by engagement with the resilient cover plate 102. A thumb screw or handle means 112 is secured to the bracket 94 or to the plate 88 to provide means for inserting and removing the assembly 82.

To thread a film through the supporting and guiding means 14, the assembly 82 is removed and the lever 36 rotated in a counterclockwise direction to lower the slide block 22 and the film supporting bar 68 attached thereto. The film is threaded on the guide tracks 78 between the flanges 76. The handle 38 of the lever 36 is then rotated in a clockwise direction (as seen in Fig. 1) until limited by engagement of its arm 58 with the adjusting screw 60, this adjusting screw being adjusted in such manner that the hardened bar 68 engages the under surface of the film with the proper degree of pressure to maintain the upper surface of the film in engagement with the recording stylus 6. The guiding and engaging means 82 for the upper surface of the film is then placed in position with the bars 86 of the shoe 84 engaging the edges of the film and maintaining the film flat across the film tracks 78 and the bar 68. The sound recorder head 4 is then adjusted to properly position the stylus with respect to the portion of the film on which the sound track is to be recorded.

Although the film facing and supporting of the block 22 surface is shown as being flat, it will be evident that it may be arcuate, in which case the film engaging portion of the shoe 84 will be similarly curved. Where the sound recorder head employed is provided with means for micrometric vertical adjustment the block 22 may be stationarily mounted with respect to the supporting base.

It will be evident from the foregoing description that applicant has provided a method of and apparatus for recording and reproducing sound on film which is simple and inexpensive and which eliminates excessive ground noises and extraneous vibration and prevents abrasion and scratching of the sound groove.

This recording unit is an integral part of a motion picture camera, which camera may be used as an instantaneous sound recording camera, as a sound recording unit without pictures, or as a camera without recording sound. Motive power for this unit may be supplied by a spring or electric motor.

Changes may be made in the form, construction and arrangement of the parts without departing from the spirit of the invention or sacrificing any of its attendant advantages, and the right is hereby reserved to make all such changes as fairly fall within the scope of the following claims:

The invention is hereby claimed as follows:

1. In a device for recording or reproducing sound on motion picture film or the like, a stylus, a fixed support, a movable support adjustably mounted on said fixed support, said movable support having a hard, smooth surface forming a track for supporting the film and having a slot extending transversely of said surface and beneath the stylus, a bar in said transverse slot, said bar having a smooth, hard surface for engaging and supporting the film beneath the point of the stylus, spring means mounting said bar in said movable support, said movable support having a second slot therein, a slide bar mounted in said slot, a cam member rotatably mounted in the fixed support and eccentrically connected to said slide bar, means for rotating said cam member to raise and lower said slide bar and said movable support to permit threading of the film between the stylus and the film supporting bar, and adjustable means for limiting the rotary movements of said cam precisely to predetermine the pressure of the film against the point of the stylus.

2. In a device for recording or reproducing sound on motion picture film or the like, a stylus, a fixed support, a movable support adjustably mounted on said fixed support, said movable support having a hard, smooth surface forming a track for supporting the film and having a slot extending transversely of said surface and beneath the stylus, a bar in said transverse slot, said bar having a smooth, hard surface for engaging and supporting the film beneath the point of the stylus, spring means mounting said bar in said movable support, said movable support having a second slot therein, a slide bar mounted in said slot, a cam member rotatably mounted in the fixed support and eccentrically connected to said slide bar, means for rotating said cam member to raise and lower said slide bar and said movable support to permit threading of the film between the stylus and the film supporting bar, adjustable means for limiting the rotary movements of said cam precisely to predetermine the pressure of the film against the point of the stylus, and a spring pressed shoe mounted on the fixed support and having spaced fingers engaging the film to maintain the film taut and flat on the film supporting bar just beneath the point of the stylus.

3. In a device for recording or reproducing sound on motion picture film or the like, a stylus, and means for maintaining a substantially constant pressure of engagement between the film and stylus, said means comprising a bar having a smooth, hard surface, spring means for resiliently supporting the bar, and a spring pressed shoe having spaced fingers engaging the film to maintain the film taut and flat on the film supporting bar at the point of engagement of the film with the stylus.

4. In a device for recording or reproducing a lateral sound track in motion picture film or the like, a stylus engaging the film, film guiding means having an opening extending transversely of the film opposite the stylus, a support beneath said film guiding means, a bar in said opening, said bar having a smooth hard surface engaging the film directly opposite the point of the stylus, and spring means supporting the bar on said support and resiliently maintaining the bar in engagement with the film.

5. In a device for recording or reproducing a lateral sound track in motion picture film or the like, a stylus, a support, a film guiding means on the support and having an opening extending transversely of the film opposite the stylus, and means for maintaining a uniform pressure engagement between the film and stylus, said means comprising a bar disposed in said opening and having a smooth hard surface engaging the film at a point directly opposite the point of engagement of the stylus with the film and a spring supporting the bar on the support and resiliently maintaining the bar in engagement with the film at said point.

6. In a device for recording sound in a motion picture film or the like, a laterally moving sound recording stylus for indenting the sound track in the film, a supporting base having a film supporting track and a slot extending transversely of the track beneath the stylus, a bar disposed in said slot and having a smooth hard surface engaging the film only beneath the point of the stylus as the stylus moves laterally to indent the sound track in the film, and a spring resiliently supporting said bar on said base and resiliently maintaining the bar in engagement with the film.

7. In a device for recording sound in a motion picture film or the like a sound recording stylus movable laterally of the film to indent the sound track in the film, a base supporting the film on the side opposite the stylus, said base having a film engaging surface relieved in the direction of travel of the film to accommodate the projecting rib formed in the film by the indentation of the sound track, said base further having a slot extending transversely of the film opposite the stylus, a bar disposed in said slot and having a smooth hard surface engaging said projecting rib of the film as it is formed by the indentation of the sound track and directly opposite the stylus to permit full free lateral movement of the stylus in indenting the sound track, and spring means supporting the bar on the base and resiliently maintaining the bar in engagement with the film.

8. In a device for recording or reproducing a lateral sound track in a motion picture film or the like a stylus, a film guide base having a slot extending transversely of the film beneath the stylus, a bar in said slot having a smooth hard surface engaging the film directly beneath the point of the stylus, a spring resiliently mounting said bar on said base for automatically maintaining the pressure of the film against the point of the stylus substantially constant, and means pressing upon the film on the same side as the stylus to maintain the film taut across the slot and beneath the stylus.

9. A mechanical unit for recording or reproducing sound by an indented sound track on a motion picture film having the usual coated and non-coated sides, a stylus adapted to engage the non-coated side of the film, a film guide having a smooth hard surface adapted to engage the coated side of the film and relieved in the direction of the movement of the film to accommodate the picture carrying area of the coated side of the film and the projecting rib formed by the indentation of the sound track, said guide having a slot extending transversely of the direction of the movement of the film and opposite the stylus, a bar in said slot and having a hard smooth surface engaging the film on the side opposite the stylus and at the projecting rib formed by the indentation of the sound track, and a spring resiliently mounting said bar in said slot and through said bar resiliently maintaining the film in engagement with the point of the stylus.

SUMTER CALVERT.